United States Patent [19]

Matuura

[11] 4,228,204

[45] Oct. 14, 1980

[54] METHOD OF TREATING GLASS FIBERS

[75] Inventor: Katuji Matuura, Mibu, Japan

[73] Assignee: Daiichikasei Co., Ltd., Tochigi, Japan

[21] Appl. No.: 972,513

[22] Filed: Dec. 22, 1978

[30] Foreign Application Priority Data

Jun. 26, 1978 [JP] Japan .................................. 53/77166
Aug. 31, 1978 [JP] Japan ................................ 53/106559

[51] Int. Cl.$^2$ ............................................. B05D 3/02
[52] U.S. Cl. ................................ 427/372.2; 427/427; 427/443.2; 427/434.6
[58] Field of Search .................... 427/399, 427, 430 B, 427/434 D, 383 B, 372 R; 65/3 R, 3 B, 60 C; 428/379, 378, 388, 389; 106/50

[56] References Cited

U.S. PATENT DOCUMENTS

| | | | |
|---|---|---|---|
| 2,699,415 | 1/1955 | Nachtman | 428/381 |
| 3,189,563 | 6/1965 | Hauel | 428/388 |
| 3,853,569 | 12/1974 | Laurent et al. | 106/50 |
| 3,856,979 | 12/1974 | Schmid | 65/3 B |
| 3,927,165 | 12/1975 | Grochol | 65/3 B |
| 3,984,591 | 10/1976 | Plumat et al. | 427/427 |
| 4,118,239 | 10/1978 | Gagin | 106/50 |
| 4,142,906 | 3/1979 | Iizawa | 106/50 |

*Primary Examiner*—Ronald H. Smith
*Assistant Examiner*—Janyce A. Bell

[57] ABSTRACT

Method of treating glass fibers which comprises treating glass fibers with an aqueous solution of zinc salt, lead salt, tin salt or mixture thereof, thereby forming a protective coating having high chemical resistance on the surface of the glass fibers.

13 Claims, No Drawings

METHOD OF TREATING GLASS FIBERS

BACKGROUND OF THE INVENTION

The present invention relates to a method of treating glass fibers by which chemical resistance is imparted to the glass fibers.

Recently, long glass fibers or short glass fibers (hereinafter referred to as glass fibers) are incorporated into mortars, concretes and the like to increase bending strength of cement products. According as diameter of the glass fibers decreases, tensile strength of the glass fibers increases. Use of glass fibers having high tensile strength affords cement products having high bending strength, so that it is recommended to use glass fibers having small diameter.

As major components of the glass fibers are silicon dioxide $SiO_2$, calcium oxide CaO, Magnesium oxide MgO, diboron trioxide $B_2O_3$, sodium oxide $Na_2O$, potassium oxide $K_2O$, aluminum oxide $Al_2O_3$ and lithium oxide $Li_2O$, the glass fibers have acid resistance at broad ranges of pH2-6. However, no glass fibers have alkali resistance at alkaline regions of pH9-14, particularly pH12-14. Alkaline earth metal oxides such as calcium oxide and magnesium oxide as well as alkali metal oxides such as sodium oxide, potassium oxide and lithium oxide are leached out from the glass fibers in the form of $Ca(OH)_2$, $Mg(OH)_2$, NaOH, KOH and LiOH respectively. Therefore, cement products having good bending strength can not be obtained in the prior art. In particular, when glass fibers having small diameter are used, deterioration of the glass fibers is remarkable because large surface areas of the glass fibers contact with alkali components present in cement.

It has been proposed that glass fibers for use in reinforcing cements should be alkali resistant and it has been proposed to use glass composition containing 5-25% by weight of zirconium oxide $ZrO_2$. However, when glass composition containing less than 10% by weight of zirconium oxide are used, glass fibers having sufficient alkali resistance can not be obtained. When glass composition containing 10-25% by weight of zirconium oxide are used, glass fibers having slight alkali resistance can be obtained. However, it is difficult to fuse the glass composition on producing glass fibers. Also, if fused, a temperature of liquid phase elevates, so that a good spinning efficiency can not be obtained. Further, glass fibers can not be formed efficiently. Furthermore, it is necessary to use a heavy-duty equipment. To overcome the drawbacks accompanied with more than 10% by weight of zirconium oxide, it has been proposed that alkali metal oxides such as $Na_2O$, $K_2O$ and $Li_2O$ (hereinafter referred to as $R_2O$) are used as flux such that the total amount of $R_2O$ is 14-18% by weight. Alternatively, it has been proposed that alkaline earth metal oxides such as CaO, MgO, BaO and/or boron family element oxides such as $B_2O_3$ are added to decrease a melting point of the glass composition. However, when $R_2O$ is added in an amount of 14-18% by weight, weathering occurs in an atmosphere or an aqueous solution. Also, $R_2O$ is leached out from the glass fibers by alkali components present in cement, so that strength of the glass fibers decreases. For example, after one year, bending strength of cement products decreases to 60% of cement products immediately after preparation. Therefore, it has been hesitated to use the glass composition containing 14-18% by weight of $R_2O$. On the other hand, when alkaline earth metal oxides and the like are incorporated into the glass composition, acid resistance of glass fibers therefrom decreases remarkably.

SUMMARY OF THE INVENTION

It is an object to provide a method of treating glass fibers by which chemical resistance is imparted to the glass fibers.

It is an another object to provide a method of treating glass fibers having substantially no alkali resistance or glass fibers having slight alkali resistance by which alkali resistance is imparted to the glass fibers.

It is a further object to provide a method of treating glass fibers having substantially no alkali resistance or glass fibers having slight alkali resistance by which weathering proof property, water resisting property, acid resistance and elasticity are imparted to the glass fibers.

These objects are achieved by the present invention which is directed to a method of treating glass fibers which comprises treating glass fibers with an aqueous solution of zinc salt, lead salt, tin salt or mixture thereof.

DETAILED DESCRIPTION OF THE INVENTION

An aqueous solution of zinc salt, lead salt, tin salt or mixture thereof is prepared. Zinc salts used in the present invention are for example zinc chloride $ZnCl_2$, zinc sulfate $ZnSO_4$, zinc nitrate $Zn(NO_3)_2$ and the like. Lead salts used in the present invention are for example lead chlorides such as lead monochloride PbCl, lead dichloride $PbCl_2$ and lead tetrachloride $PbCl_4$; lead sulfates such as plumbous sulfate $PbSO_4$ and plumbic sulfate $Pb(SO_4)_2$; lead nitrate $Pb(NO_3)_2$ and the like. Tin salts used in the present invention are for example tin chlorides such as stannous chloride $SnCl_2$ and stannic chloride $SnCl_4$; tin sulfates such as stannous sulfate $SnSO_4$ and stannic sulfate $Sn(SO_4)_2$; tin nitrates such as stannous nitrate $Sn(NO_3)_2$ and stannic nitrate $Sn(NO_3)_4$ and the like. Concentration of acid aqueous solution of zinc salt, lead salt, tin salt or mixture thereof is 2-25% by weight, preferably 10-15% by weight.

Said aqueous solution prepared as described above is applied to glass fibers by means of dipping, spraying, painting and the like so as to treat the surface of the glass fibers with said aqueous solution. Thereby, protective coating having chemical resistance, particularly high alkali resistance is formed on the surface of the glass fibers.

Any glass fibers may be treated with said aqueous solution in the present invention. Representative glass fibers are for example as follows: (a) glass fibers having substantially no alkali resistance consisting essentially of silicon dioxide $SiO_2$, aluminum oxide $Al_2O_3$, diboron trioxide $B_2O_3$, magnesium oxide MgO, calcium oxide CaO, barium oxide BaO, alkali metal oxides $R_2O(Na_2O$, $K_2O$, $Li_2O)$ and ferric oxide $Fe_2O_3$; (b) glass fibers having slight alkali resistance comprising essentially up to 10% by weight of zirconium oxide, 54-60% by weight of silicon dioxide, 0-6% by weight of aluminum oxide, 0-7% by weight of magnesium oxide, 5-9% by weight of calcium oxide, 1-6% by weight of barium oxide, 12-20% by weight of alkali metal oxides and 0-4% by weight of ferric oxide; (c) glass fibers having slight alkali resistance comprising essentially 10-25% by weight of zirconium oxide, 54-58% by weight of silicon dioxide, 0-4% by weight of aluminum oxide, 0–5% by weight of magnesium oxide, 5–9% by weight of calcium oxide, 1–6% by weight of barium oxide, 14–18% by weight of alkali metal oxides and 0–5% by weight of ferric oxide. Common impurities may also present in a proportion of up to 1% by weight. Further additives may be included in proportions of up to 1% by weight to assist in refining of the glass fibers. Such oxides are for example $P_2O_5$, $Cr_2O_3$, $TiO$, $As_2O_3$, $Sb_2O_3$, $CdO$, $BeO$ and $V_2O_5$.

It is deemed that the protective coating having chemical resistance, particularly high alkali resistance is formed by the following mechanism. The mechanism is explained by one example in which silicate glass fibers are treated with an aqueous solution of $ZnCl_2$. When the surface of the glass fibers is treated with the aqueous solution, cations such as $Na^+$, $Li^+$, $Ca^{2+}$, $Mg^{2+}$ and $Ba^{2+}$ bonded weakly to net work of Si—O react rapidly with reactive $Cl^-$ anion to form salts such as $NaCl$, $LiCl$, $CaCl_2$, $MgCl_2$ and $BaCl_2$. The salts thus formed are leached out from the surface of the glass fibers. $Zn^{2+}$ is substituted immediately for the cations to form a colloidal zinc protective coating. The protective coating thus formed is stable and has good chemical resistance against acids and alkali at ambient temperature. Also, in case of $PbCl_2$, $SnCl_2$, $ZnSO_4$, $PbSO_4$, $SnSO_4$, $Zn(NO_3)_2$, $Pb(NO_3)_2$ or $Sn(NO_3)_2$, a similar colloidal protective coating having good chemical resistance can be formed.

The glass fibers treated as described above are washed with water, and then dried at a temperature of 80°–200° C.

As described above, according to the present invention, the colloidal protective coating containing zinc, lead, tin or mixture thereof is formed on the surface of the glass fibers. Accordingly, the treated glass fibers have high alkali resistance. Further, the treated glass fibers have good characteristics such as weathering proof property, water resisting property, acid resistance and elasticity. When the glass fibers treated by the method of the present invention are incorporated into mortars, concretes or plastics, cement products or plastic products having high bending strength and compressive strength may be formed. Furthermore, as the glass fibers treated by the method of the present invention have high elasticity, cement products obtained therefrom have no cracking.

The following examples are given as specific illustrations of the present invention. It should be understood, however, that the present invention is not limited to the specific details set forth in the examples. All percent and parts are by weight.

EXAMPLE 1

[A] $ZnCl_2$ was added to water to prepare 15% $ZnCl_2$ acidic aqueous solution having pH4. Raw glass fiber in diameter 13$\mu$ in length 25 mm is prepared using the following components:

| | |
|---|---|
| $SiO_2$ | 53.60% |
| $CaO$ | 20.56% |
| $Al_2O_3$ | 14.38% |
| $B_2O_3$ | 8.42% |
| $MgO$ | 1.91% |
| $BaO$ | 0.58% |
| $R_2O(K_2O, Li_2O)$ | 0.36% |
| $Fe_2O_3$ | 0.22% |

Two grams of strand were made of four hundred of the glass fibers. The strand having 4.238 Kg/400 H of tensile strength was dipped into the acidic aqueous solution for 1.5 seconds at ambient temperature. Thereafter, the treated glass fibers were immediately washed with water, and then dried at a temperature of 100° C.

For determination of alkali resistance of the treated glass fibers, the treated glass fibers were dipped into a cement extract having pH13 for 200 hours at a temperature of 80° C., washed with water and then dried. Tensile strength and alkali loss were measured. The results obtained are shown in Table 1. For comparison, tensile strength and alkali loss of raw glass fibers which were not subjected to surface-treatment were measured, and the results obtained are shown in Table 1.

TABLE 1

| | Speci-men Nos. | Tensile strength before dipping into the cement extract (Kg/400H) | After dipping into the cement extract | | Percent of alkali loss (%) |
|---|---|---|---|---|---|
| | | | Tensile strength (Kg/400H) | Alkali loss (g) | |
| Example 1 | 1 | 4.55 | 4.03 | 0.03 | 1.5 |
| | 2 | 4.45 | 3.75 | 0.01 | 0.5 |
| | 3 | 5.30 | 3.81 | 0.00 | 0.0 |
| | 4 | 4.10 | 3.46 | 0.05 | 2.5 |
| | 5 | 5.04 | 3.70 | 0.00 | 0.0 |
| | average | 4.688 | 3.750 | 0.018 | 0.9 |
| comparative example 1 | 6 | 4.68 | immeasurable | 0.80 | 40 |

As is apparent from the Table 1, tensile strength of the glass fibers treated by the method of the present invention does not substantially decrease and alkali loss is slight, whereas the treated glass fibers are dipped into the cement extract. This shows the fact that the treated glass fibers have sufficient alkali resistance. On the contrary, glass fibers of comparative example 1 have insufficient alkali resistance.

Unexpectedly, it has now been found that tensile strength of the treated glass fibers before dipping into the cement extract is higher than that of raw glass fibers. [B] Two parts of the treated glass fibers were mixed with 100 parts of Portland cement, 300 parts of standard river sand and 60 parts of water. Then, the mixture was molded in a molding box to form a molded product of 40×40×160 mm, and then let the molded product stand for 24 hours. Then, the molded product was removed from the molding box. The molded product was cured in water for 28 days at a temperature of 20°±2° C. to form a mortar product. For comparison, raw glass fibers were used in place of the treated glass fibers to form a mortar product. Bending strength and compressive strength of these mortar products were measured, and the results obtained are shown in Table 2.

TABLE 2

| Bending strength (Kg/cm$^2$) | | Compressive strength (Kg/cm$^2$) | |
|---|---|---|---|
| Example 1 | Comparative example 1 | Example 1 | Comparative example 1 |
| 96.12 | 60.16 | 392.4 | 360.2 |

As is apparent from the Table 2, bending strength of the mortar product of Example 1 is considerably higher than that of the mortar product of comparative example 1. Further, compressive strength of the mortar product of Example 1 is slightly higher than that of the mortar product of comparative example 1.

EXAMPLE 2

Example 1 was repeated. For comparison, glass fibers were treated with 5% $ZrCl_4$ aqueous solution in accordance with Japanese Patent Publication No. 30200/1975 (comparative example 2). Tensile strength of glass fibers of Example 2 and comparative example 2 before dipping into the cement extract were measured. Further, tensile strength of them after dipping into it were measured. The results obtained are shown in Table 3.

TABLE 3

| | Tensile strength raw glass fibers before surface-treatment (Kg/400H) | Example 2 Tensile strength (Kg/400H) | | Comparative example 2 Tensile strength (Kg/400H) | |
|---|---|---|---|---|---|
| Specimen Nos. | | Before dipping into the cement extract | After dipping into the cement extract | Before dipping into the cement extract | After dipping into the cement extract |
| 1 | 3.35 | 4.66 | 3.98 | 3.88 | 2.20 |
| 2 | 4.53 | 5.04 | 3.72 | 2.98 | 2.65 |
| 3 | 4.80 | 4.44 | 4.10 | 2.78 | 2.01 |
| 4 | 4.50 | 4.10 | 3.24 | 3.66 | 1.98 |
| 5 | 3.91 | 4.58 | 3.42 | 3.43 | 2.00 |
| 6 | 3.51 | 4.45 | 3.87 | 2.68 | 2.13 |
| 7 | 4.79 | 4.62 | 3.12 | 3.31 | 2.07 |
| 8 | 3.75 | 4.82 | 3.40 | 2.76 | 2.11 |
| 9 | 4.30 | 4.00 | 3.68 | 2.73 | 1.71 |
| 10 | 3.95 | 4.21 | 3.80 | 3.10 | 1.93 |
| average | 4.139 | 4.492 | 3.663 | 3.131 | 2.079 |

As is apparent from the Table 3, the glass fibers treated by the method of the present invention (Example 2) have good alkali resistance. On the contrary, the glass fibers treated by the prior art (comparative example 2) have insufficient alkali resistance.

EXAMPLE 3

Example 1 was repeated with the exception that glass fibers having the following components were used.

| | |
|---|---|
| $SiO_2$ | 54% |
| $R_2O(K_2O, Li_2O)$ | 14% |
| $ZrO_2$ | 8% |
| BaO | 6% |
| MgO | 5% |
| CaO | 5% |
| $Al_2O_3$ | 4% |
| $Fe_2O_3$ | 4% |

The glass fibers have 3.012 Kg/400 H of tensile strength. Tensile strength of glass fibers treated by the method of the present invention was measured. Further, tensile strength and alkali loss of the glass fibers which were dipped into the cement extract were measured. The results obtained are shown in Table 4. For comparison, raw glass fibers which are not subjected to surface-treatment were dipped into the cement extract, and the results obtained are shown in Table 4.

TABLE 4

| | Specimen Nos. | Tensile strength before dipping into the cement extract (Kg/400H) | After dipping into the cement extract | | Percent of alkali loss (%) |
|---|---|---|---|---|---|
| | | | Tensile strength (Kg/400H) | Alkali loss (g) | |
| Example 3 | 1 | 3.20 | 3.12 | 0.02 | 1.0 |
| | 2 | 3.05 | 2.90 | 0.03 | 1.5 |
| | 3 | 3.21 | 3.05 | 0.00 | 0.0 |
| | 4 | 3.11 | 3.10 | 0.00 | 0.0 |
| | 5 | 3.25 | 3.20 | 0.01 | 0.5 |
| | average | 3.164 | 3.074 | 0.012 | 0.6 |
| comeparative example 3 | 6 | 2.195 | — | — | — |

As is apparent from the Table 4, tensile strength of the glass fibers treated by the method of the present invention does not substantially decrease and alkali loss is slight, whereas the treated glass fibers are dipped into the cement extract. This shows the fact that glass fibers containing a small amount of zirconium oxide can be treated by the method of the present invention. On the contrary, glass fibers of comparative example 3 have insufficient alkali resistance.

Unexpectedly, it has now been found that tensile strength of the treated glass fibers before dipping into the cement extract is higher than that of raw glass fibers.

EXAMPLE 4

Example 1 was repeated with the exception that 15% $PbCl_2$ acidic aqueous solution having pH6 was used in place of $ZnCl_2$ acidic aqueous solution. Tensile strength of the treated glass fibers was measured. Further, tensile strength and alkali loss of the treated glass fibers which were dipped into the cement extract were measured. The results obtained are shown in Table 5.

TABLE 5

| Specimen Nos. | Tensile strength before dipping into the cement extract (Kg/400H) | After dipping into the cement extract | | Percent of alkali loss (%) |
|---|---|---|---|---|
| | | Tensile strength (Kg/400H) | Alkali loss (g) | |
| 1 | 3.85 | 2.13 | 0.07 | 3.5 |
| 2 | 3.60 | 2.42 | 0.11 | 5.5 |
| 3 | 3.42 | 2.11 | 0.18 | 9.0 |
| 4 | 3.51 | 2.57 | 0.10 | 5.0 |
| 5 | 3.54 | 2.70 | 0.07 | 3.5 |
| average | 3.584 | 2.386 | 0.106 | 5.3 |

As is apparent from the Table 5, decrease of tensile strength of the treated glass fibers is relatively low and alkali loss is slight, whereas the treated glass fibers are dipped into the cement extract. This shows the fact that the treated glass fibers have comparatively good alkali resistance.

EXAMPLE 5

Example 3 was repeated with the exception that 15% $PbCl_2$ acidic aqueous solution having pH6 was used in place of $ZnCl_2$ acidic aqueous solution. Tensile strength of the treated glass fibers was measured. Further, tensile strength and alkali loss of the treated glass fibers which were dipped into the cement extract were measured. The results obtained are shown in Table 6.

TABLE 6

| Specimen Nos. | Tensile strength before dipping into the cement extract (Kg/400H) | After dipping into the cement extract | | Percent of alkali loss (%) |
|---|---|---|---|---|
| | | Tensile strength (Kg/400H) | Alkali loss (g) | |
| 1 | 3.05 | 2.97 | 0.10 | 5.0 |
| 2 | 3.10 | 3.02 | 0.08 | 4.0 |
| 3 | 3.12 | 3.09 | 0.13 | 6.5 |
| 4 | 3.00 | 2.72 | 0.12 | 6.0 |
| 5 | 3.04 | 2.80 | 0.10 | 5.0 |
| average | 3.062 | 2.920 | 0.106 | 5.3 |

As is apparent from the Table 6, tensile strength of the glass fibers treated by the method of the present invention does not substantially decrease and alkali loss is slight, whereas the treated glass fibers are dipped into the cement extract. This shows the fact that the treated glass fibers have sufficient alkali resistance.

EXAMPLE 6

Example 1 was repeated with the exception that 15% $SnCl_2$ acidic aqueous solution was used in place of $ZnCl_2$ acidic aqueous solution. Tensile strength of the treated glass fibers was measured. Further, tensile strength and alkali loss of the treated glass fibers which were dipped into the cement extract were measured. The results obtained are shown in Table 7.

TABLE 7

| Specimen Nos. | Tensile strength before dipping into the cement extract (Kg/400H) | After dipping into the cement extract | | Percent of alkali loss (%) |
|---|---|---|---|---|
| | | Tensile strength (Kg/400H) | Alkali loss (g) | |
| 1 | 4.01 | 3.07 | 0.10 | 5.0 |
| 2 | 3.93 | 2.30 | 0.12 | 6.0 |
| 3 | 4.11 | 2.59 | 0.17 | 8.5 |
| 4 | 4.07 | 2.65 | 0.19 | 9.5 |
| 5 | 4.21 | 2.50 | 0.07 | 3.5 |
| average | 4.066 | 2.622 | 0.13 | 6.5 |

As is apparent from the Table 7, decrease of tensile strength of the treated glass fibers is relatively low and alkali loss is slight, whereas the treated glass fibers are dipped into the cement extract. This shows the fact that the treated glass fibers have comparatively good alkali resistance.

EXAMPLE 7

Example 3 was repeated with the exception that 15% $SnCl_2$ acidic aqueous solution was used in place of $ZnCl_2$ acidic aqueous solution. Tensile strength of the treated glass fibers was measured. Further, tensile strength and alkali loss of the treated glass fibers which were dipped into the cement extract were measured. The results obtained are shown in Table 8.

TABLE 8

| Specimen Nos. | Tensile strength before dipping into the cement extract (Kg/400H) | After dipping into the cement extract | | Percent of alkali loss (%) |
|---|---|---|---|---|
| | | Tensile strength (Kg/400H) | Alkali loss (g) | |
| 1 | 3.70 | 2.11 | 0.19 | 9.5 |
| 2 | 3.00 | 1.78 | 0.08 | 4 |

TABLE 8-continued

| Specimen Nos. | Tensile strength before dipping into the cement extract (Kg/400H) | After dipping into the cement extract | | Percent of alkali loss (%) |
|---|---|---|---|---|
| | | Tensile strength (Kg/400H) | Alkali loss (g) | |
| 3 | 3.12 | 1.90 | 0.17 | 8.5 |
| 4 | 3.15 | 1.97 | 0.19 | 9.5 |
| 5 | 3.21 | 2.03 | 0.10 | 5 |
| average | 3.236 | 1.958 | 0.146 | 7.3 |

As is apparent from the Table 8, decrease of tensile strength of the treated glass fibers is relatively low and alkali loss is slight, whereas the treated glass fibers are dipped into the cement extract. This shows the fact that the treated glass fibers have comparatively good alkali resistance.

EXAMPLES 8–13

Example 1 was repeated with the exception that various acidic aqueous solutions shown in the following Table 9 were used. Tensile strength and alkali loss of the treated glass fibers which were dipped into the cement extract were measured, and the results obtained are shown in Table 9.

TABLE 9

| Examples Nos. | Kind of aqueous solution | pH | After dipping into the cement extract | |
|---|---|---|---|---|
| | | | Tensile strength (Kg/400H) | Percent of alkali loss |
| Example 8 | 15% $ZnSO_4$ | 4 | 3.231 | 1.10 |
| Example 9 | 15% $PbSO_4$ | 6 | 2.051 | 1.54 |
| Example 10 | 15% $SnSO_4$ | 3 | 1.988 | 1.72 |
| Example 11 | 15% $Zn(NO_3)_2$ | 4 | 3.003 | 0.98 |
| Example 12 | 15% $Pb(NO_3)_2$ | 6 | 2.117 | 1.82 |
| Example 13 | 15% $Sn(NO_3)_2$ | 3 | 2.005 | 1.53 |

As is apparent from the Table 9, glass fibers treated by sulfates such as $ZnSO_4$, $PbSO_4$ and $SnSO_4$ as well as nitrates such as $Zn(NO_3)_2$, $Pb(NO_3)_2$ and $Sn(NO_3)_2$ have substantially same alkali resistance as the treated glass fibers of Examples 1–7. Decrease of tensile strength of the treated glass fibers is relatively low and alkali loss is slight, whereas the treated glass fibers are dipped into the cement extract.

EXAMPLES 14–17

Example 1 was repeated with the exception that 15% acidic mixtures shown in Table 10 were used in place of $ZnCl_2$ acidic aqueous solution. Each component present in mixture was used in same concentration. Tensile strength and alkali loss of the treated glass fibers which were dipped into the cement extract were measured. The results obtained are shown in Table 10.

TABLE 10

| Examples Nos. | Kind of mixture | pH | After dipping into the cement extract | |
|---|---|---|---|---|
| | | | Tensile strength (Kg/400H) | Percent of alkali loss (%) |
| Example 14 | $ZnCl_2$ + $SnCl_2$ | 4 | 3.641 | 1.21 |
| Example 15 | $ZnCl_2$ + $ZnSO_4$ | 4 | 3.873 | 1.20 |
| Example 16 | $ZnCl_2$ + $Zn(NO_3)_2$ | 4 | 3.652 | 1.31 |
| Example 17 | $ZnCl_2$ + | 3 | 3.621 | 1.17 |

TABLE 10-continued

| Examples Nos. | Kind of mixture | pH | After dipping into the cement extract | |
|---|---|---|---|---|
| | | | Tensile strength (Kg/400H) | Percent of alkali loss (%) |
| | SnSO$_4$ | | | |

As is apparent from the Table 10, tensile strength of the glass fibers treated by the method of the present invention does not substantially decrease and alkali loss is slight, whereas the treated glass fibers are dipped into the cement extract. This shows the fact that the glass fibers treated by mixture have sufficient alkali resistance.

The alkali-resistant glass fibers obtained by Examples 2-17 were incorporated into concretes. Concrete products thus obtained have good physical properties such as bending strength.

EXAMPLE 18

[A] ZnCl$_2$ was added to water to prepare 15% ZnCl$_2$ acidic aqueous solution having pH4. Raw glass fiber in diameter 13μ and in length 25 mm is prepared using the following components:

| | |
|---|---|
| SiO$_2$ | 54% |
| CaO | 5% |
| Al$_2$O$_3$ | 4% |
| BaO | 2% |
| R$_2$O(K$_2$O, Li$_2$O) | 18% |
| ZrO$_2$ | 17% |

Two grams of strand were made of four hundred of the glass fibers. The strand having 3.142 Kg/400 H of tensile strength was dipped into the acidic aqueous solution for 1.5 seconds at ambient temperature. Thereafter, the treated glass fibers were immediately washed with water, and then dried at a temperature of 90° C.

For determination of alkali resistance of the treated glass fibers, the treated glass fibers were dipped into a cement extract having pH12 for 240 hours at a temperature of 80° C., washed with water and then dried. Tensile strength and alkali loss were measured. The results obtained are shown in Tables 11-12. For comparison, tensile strength and alkali loss of raw glass fibers which were not subjected to surface-treatment were measured, and the results obtained are shown in Tables 11-12.

TABLE 11

| Specimen Nos. | Example 18 Tensile strength (Kg/400H) | | Comparative example 4 Tensile strength (Kg/400H) | |
|---|---|---|---|---|
| | Before dipping into the cement extract | After dipping into the cement extract | Before dipping into the cement extract | After dipping into the cement extract |
| 1 | 3.52 | 3.42 | 3.01 | 2.50 |
| 2 | 3.40 | 3.63 | 3.05 | 2.26 |
| 3 | 3.56 | 3.90 | 3.21 | 2.25 |
| 4 | 3.51 | 3.52 | 3.42 | 2.05 |
| 5 | 3.73 | 3.85 | 3.08 | 1.92 |
| 6 | 3.67 | 3.67 | 3.25 | 2.19 |
| 7 | 3.91 | 3.50 | 3.16 | 2.01 |
| 8 | 3.82 | 3.52 | 3.08 | 1.98 |
| 9 | 3.81 | 3.60 | 3.10 | 2.24 |
| 10 | 3.73 | 3.51 | 3.06 | 2.22 |
| Average | 3.666 | 3.612 | 3.142 | 2.162 |

TABLE 12

| Specimen Nos. | Alakli loss (g) | |
|---|---|---|
| | Example 18 | Comparative example 4 |
| 1 | 0.00 | 0.04 |
| 2 | 0.01 | 0.13 |
| 3 | 0.00 | 0.27 |
| 4 | 0.02 | 0.02 |
| 5 | 0.03 | 0.05 |
| 6 | 0.00 | 0.06 |
| 7 | 0.00 | 0.12 |
| 8 | 0.00 | 0.10 |
| 9 | 0.01 | 0.09 |
| 10 | 0.01 | 0.07 |
| average | 0.008 | 0.095 |

As is apparent from the Tables 11-12, tensile strength of the glass fibers treated by the method of the present invention does not substantially decrease and alkali loss is slight, whereas the treated glass fibers are dipped into the cement extract. This shows the fact that the treated glass fibers have sufficient alkali resistance. On the contrary, glass fibers of comparative example 4 have insufficient alkali resistance.

Unexpectedly, it has now been found that tensile strength of the treated glass fibers before dipping into the cement extract is higher than that of raw glass fibers. [B] Two parts of the treated glass fibers were mixed with 100 parts of Portland cement, 300 parts of standard river sand and 60 parts of water. Then, the mixture was molded in a molding box to form a molded product of 40×40×160 mm, and then let the molded product stand for 24 hours. Then, the molded product was removed from the molding box. The molded product was cured in water for 28 days at a temperature of 20°±2° C. to form a mortar product. For comparison, raw glass fibers were used in place of the treated glass fibers to form a mortar product. Bending strength and compressive strength of these mortar products were measured, and the results are shown in Table 13.

TABLE 13

| Specimen Nos. | Bending strength (Kg/cm$^2$) | | Compressive strength (Kg/cm$^2$) | |
|---|---|---|---|---|
| | Example 18 | Comparative Example 4 | Example 18 | Comparative Example 4 |
| 1 | 89.7 | 65.4 | 362 | 350 |
| 2 | 95.6 | 59.7 | 367 | 358 |
| 3 | 88.2 | 63.4 | 368 | 345 |
| 4 | 89.7 | 62.3 | 362 | 358 |
| 5 | 92.4 | 64.0 | 358 | 357 |
| average | 91.12 | 62.96 | 363.4 | 353.6 |

As is apparent from the Table 13, bending strength of the mortar product of Example 18 is considerably higher than that of the mortar product of comparative example 4. Further, compressive strength of the mortar product of Example 18 is slightly higher than that of the mortar product of comparative example 4.

Although the present invention has been described with preferred embodiments, it is to be understood that variations and modifications may be resorted to as will be apparent to those skilled in the art. Such variations and modifications are to be considered within the purview and scope of the claims appended hereto.

What is claimed is:

1. A method of imparting chemical resistance to glass fibers which comprises the steps of treating glass fibers with a substantially aqueous solution of 2–25% by weight of a metal salt selected from the group consisting of zinc salt, lead salt, tin salt or mixtures thereof, to form a protective coating having high chemical resistance on the surface of the glass fibers, then washing the treated glass fibers with water and thereafter drying the washed glass fibers at a temperature of from 80 deg. C. to 200 deg. C.

2. The method according to claim 1, wherein said glass fibers to be treated are ones containing no zirconium oxide and having substantially no alkali resistance.

3. The method according to claim 1, wherein said glass fibers to be treated are ones containing up to 25% by weight of zirconium oxide and having slight alkali resistance.

4. The method according to claim 3, wherein said glass fibers having slight alkali resistance comprise essentially up to 10% by weight of zirconium oxide, 54–60% by weight of silicon dioxide, 0–6% by weight of aluminum oxide, 0–7% by weight of magnesium oxide, 5–9% by weight of calcium oxide, 1–6% by weight of barium oxide, 12–20% by weight of alkali metal oxides and 0–4% by weight of ferric oxide.

5. The method according to claim 3, wherein said glass fibers having slight alkali resistance comprise essentially 10–25% by weight of zirconium oxide, 54–58% by weight of silicon dioxide, 0–4% by weight of aluminum oxide, 0–5% by weight of magnesium oxide, 5–9% by weight of calcium oxide, 1–6% by weight of barium oxide, 14–18% by weight of alkali metal oxides and 0–5% by weight of ferric oxide.

6. The method according to claim 1, wherein said zinc salt is zinc chloride, zinc sulfate or zinc nitrate.

7. The method according to claim 1, wherein said lead salt is lead chloride, lead sulfate or lead nitrate.

8. The method according to claim 1, wherein said tin salt is tin chloride, tin sulfate or tin nitrate.

9. The method according to claim 6, wherein concentration of said zinc salt is 10–15% by weight of said aqueous solution.

10. The method according to claim 7, wherein concentration of said lead salt is 10–15% by weight of said aqueous solution.

11. The method according to claim 8, wherein concentration of said tin salt is 10–15% by weight of said aqueous solution.

12. The method according to claim 1, wherein said aqueous solution is applied to glass fibers by means of dipping, spraying or painting.

13. The method according to claim 1 wherein said solution of metal salts is entirely aqueous.

* * * * *